(12) United States Patent
King

(10) Patent No.: US 6,532,812 B2
(45) Date of Patent: Mar. 18, 2003

(54) METHOD FOR IMPROVING VEHICLE TIRE TREAD WEAR

(75) Inventor: Richard T. King, Bellevue, WA (US)

(73) Assignee: Ambient, Inc., Bellevue, WA (US)

( * ) Notice: Subject to any disclaimer, the term of this patent is extended or adjusted under 35 U.S.C. 154(b) by 0 days.

(21) Appl. No.: 09/840,702

(22) Filed: Apr. 23, 2001

(65) Prior Publication Data

US 2002/0152805 A1 Oct. 24, 2002

(51) Int. Cl.$^7$ .............................................. G01M 17/02
(52) U.S. Cl. ........................................................ 73/146
(58) Field of Search ............................... 73/146, 146.2, 73/146.3, 146.4, 146.5, 146.8, 8

(56) References Cited

U.S. PATENT DOCUMENTS 4,114,279 A * 9/1978 Johnson et al. ............... 73/146
4,355,299 A * 10/1982 Cook et al. ................. 73/146.2
5,723,782 A * 3/1998 Bolles, Jr. ..................... 73/146
6,244,116 B1 * 6/2001 Osmer et al. .......... 73/862.474

* cited by examiner

Primary Examiner—Hezron Williams
Assistant Examiner—Andre Allen
(74) Attorney, Agent, or Firm—Keith D. Gehr

(57) ABSTRACT

Described is a method of optimizing tire pressures in order to obtain maximum tire tread life and performance. The method involves calculation of the live and dead loads on each individual tire of the vehicle. Grown diameter of the tires in use is obtained from published data sheets. The grown diameter is then multiplied by an empirically derived tread length determining factor to obtain an optimum tread length in contact with the road surface. In turn the tread length is multiplied by effective tread width to obtain a footprint area for the tires. Finally, the load carried by the individual tires is divided by the footprint area to obtain an optimum inflation pressure.

9 Claims, No Drawings

METHOD FOR IMPROVING VEHICLE TIRE TREAD WEAR

The present invention is directed to a method for significantly improving tread wear of the tires used on all types of vehicles.

BACKGROUND OF THE INVENTION

Many improvements have been made over the years in durability of pneumatic tires used on cars, sport utility vehicles, trucks, trailers and other types of vehicles. While 20,000 miles was once considered excellent tire life for a passenger car, improved tire manufacturing and components have now extended this by a factor of two to three under normal conditions. "Normal conditions" include maintenance of recommended inflation pressures, regular rotation of tires, and driving principally on a relatively smooth road surface at moderate speeds. In the real world these conditions are rarely met and tires must be replaced far earlier than might otherwise be required. Of the conditions listed above, only the road surface is not under possible control of the driver. However, human nature being what it is, most drivers are lax about routine tire maintenance. Rotation is an occasional event, if done at all, and tire pressure checks are often left undone until it is obvious from tire appearance and tread indications that something is wrong. To further act against obtaining longer tread life, the inflation recommendations given by auto manufacturers often seem to be pulled out of thin air rather than based on their own product data publications. These pressures are usually found on a plate on a vehicle door frame or published in the Owner's Manual. Equal pressures are often recommended for all tires on a given vehicle regardless of the fact that in most instances front and rear tires carry significantly different loads. This condition is further exaggerated in front wheel drive vehicles. Strangely, even when they are inflated to the same pressures, front and rear tires are expected to perform equally despite these load differences.

Empirical studies have found that front and rear tires inflated to similar pressures show very different wear patterns on their treads after only a relatively few thousands of miles. Front tires usually show much more wear along the tread edges. This is a result of excessive tire deflection or deformation that takes place as the tire contacts the road surface. "Deflection" is the term used to measure the differences in radii from the center point to the top of the tire and the center of the tire to the road contact surface. Deflection is caused by the necessity for the tire to flatten as it contacts the road surface in order to distribute its load carrying capacity. This condition of excessive edge wear is often called "swiping" when tires wear unevenly across the tread due to under inflation.

In contrast to the usual pattern of front tire wear, rear tires frequently show greater wear in the center portion of the tread. In most instances this is due to over inflation. This can cause internal stresses within the tire, stresses which the tire is least designed to resist.

Under inflation in particular is destructive to tire life since the tire experiences much greater flexing and heat buildup during use. It must be remembered that at 60 mph the average tire rotates 14 times per second.

The set of conditions described above creates an undesirable environment for optimum tire life and performance. It is not the purpose of the present invention to recommend vehicle and tire size match-ups. The invention is based on the discovery that each tire size has its own optimum deflection which should remain constant, regardless of load carried. Stated otherwise, since deflection correlates directly with "footprint", each tire should maintain a constant optimum footprint regardless of load carried.

SUMMARY OF THE INVENTION

The present invention offers a means of calculating optimum tire pressures to obtain maximum tire life and performance. It is based in part on correlating tire loading, tire pressure, and tire deflection in order to obtain optimum "footprints" for every combination of tire load and tire position on any vehicle. "Footprint", also called "contact patch", is the area of tread in contact with the road surface at any given instant. The method is useful not only for passenger cars but also for light and heavy trucks, trailers, or any vehicle which may be equipped with either single or dual wheels. It can accommodate any combination of axles, tire load, tire position and tire size. Rear wheels may be single or dual and the vehicle may have a plurality of rear axles. The method is readily applicable when replacement tires are of a different size than the original tires used.

The method involves several steps. The first step is to determine vehicle curb mass/weight distributed to the front and rear axles or any axle combinations. Curb mass/weight is the weight of a vehicle without occupants. This information is found within the extensive specification sheets published by vehicle manufacturers for every make and model they produce. Similar information for all nameplates can also be found in Motor Vehicle Manufacturers Specifications, published by the American Automobile Manufacturers Association. These publications are readily available in many libraries. The vehicle owner can provide the passenger and cargo weights and their location in the vehicle. Total operating dead loads and live loads and their distribution can then be determined. This will include curb mass/weight, occupants, and cargo. The percentage of this added weight to each axle is then assigned, again using manufacturers data; e.g., percentage distribution of weight in front and/or rear seats to each axle. Total weight is then easily converted to weight carried by each axle and on each individual tire. This information is part of that which is essential to derive optimum conditions of tire inflation for maximum tread life and performance. Optionally, the vehicle may be weighed on a scale to determine axle loads.

Extensive data sheets are also available for every size and type of tire produced. This data is available in trade publications of the Tire and Rim Manufacturers Association, Inc. (TRA), Copley, Ohio. Among the numerous parameters available in TRA publications is "grown tire diameter". Grown diameter is tire diameter under designated inflation conditions and after a prescribed minimum amount of use. Any given tire size has a fixed section width, although this does not indicate effective tread width. Actual effective tread width should be measured on the particular tires in use at the time. The tread length in contact with the road surface can vary dramatically with the ratio of tire pressure to applied load. This then becomes the effective tread length in contact with the road surface under one condition of use. Effective tread length multiplied by effective tread width determines the footprint (or contact patch) area.

Critical to the present invention are empirically determined "tread length determining factors" which are key to determining optimum tire tread wear. These factors have been determined by extensive experimentation. The grown diameter is multiplied by the tread length factor to determine optimum tread length in contact with the road surface. The factors for both front and rear tires are dimensionless numbers within the range of about 0.190 to 0.210, most preferably in the range of about 0.200 to 0.205. The factor for front tires is normally somewhat smaller, being about 96% to 98% of that of the rear tires. Ideally the front tire factor will be about 0.200 and the rear tire factor about 0.205. The factor is smaller for the front tires due to the more demanding requirements, such as steering and a proportionately heavier load.

Tread width contacting the road surface must usually be determined by actual measurement of the tires being used. Multiplying tread width by calculated optimum tread length gives the area of tire contact with the surface or the tire's "footprint". Finally, dividing the individual load on a tire by footprint area will give optimum inflation pressure. This method of optimizing deflection and corresponding footprint area has been found to significantly extend tire life; e.g., often to double or triple tread life, as opposed to using usual manufacturer recommended pressures.

It thus becomes possible for individuals to customize their tire pressures according to vehicle weight and load distributions for any given set of conditions of use. By so doing they will significantly extend tire tread life and achieve better tire performance.

It is an object of the present invention to provide a method of extending tire tread life and tire performance by determining optimum inflation pressures.

It is a further object to provide a method that determines air pressure in individual tires in any position of use on a vehicle to create an optimum road-contact footprint for the particular tires in use.

It is also an object to provide a method whereby the air pressure in each individual tire can be determined to enable a driver to inflate tires so that tread length in contact with the road conforms to optimum values defined by the formula of the invention.

It is yet an object to provide a method whereby tire pressure is adjusted based on the actual load borne by individual tires.

These and many other objects will become readily apparent to those skilled in the art upon reading the following detailed description.

DETAILED DESCRIPTION OF THE PREFERRED EMBODIMENTS

The invention is best understood by considering an example in which a specific make and model of car and size of tires is assumed. The products noted in the following description are used only as a matter of convenience in explanation. This is not intended to be an endorsement of these or any similar products.

As an example, a 1998 model year Lincoln Continental may be chosen. This is equipped with P255/60 R16 Michelin tires on all four wheels. In TRA tire designations P indicates a passenger car tire, 225 is the tire section width in mm, 60 indicates that the section height is 60% of the section width, R indicates radial construction, and 16 designates the rim diameter in inches. The recommended manufacturer tire inflation pressure is 32 psi for the front tires and 28 psi for the rear tires. It should be noted that section width is not a measure of tread width. Though section width is an industry standard measure of width for a specific tire designation, tread widths will vary significantly within the same tire size designation from manufacturer to manufacturer.

Referring to the Motor Vehicle Manufacturers Specifications, published by the American Automobile Manufacturers Association (AAMA) and by the Ford Motor Company it is found that the curb mass/weight is 3880 lb with an operational weight of 4000 pounds. This weight is distributed 62% (2480 pounds) to the front axle and 38% (1520 pounds) to the rear axle. Front seat passenger mass is distributed 51% to the front axle and 49% to the rear axle. Only 18% of the rear seat passenger mass is carried on the front axle and the remaining 82% is distributed to the rear axle.

The Tire and Rim Manufacturers Association (TRA) cites 27.01 inches as the grown diameter of the tire in the examples. These standards are available for any tire size and are used in part by vehicle manufacturers in designing for tire clearances.

Assume as one example that the car is used for a daily commute and carries two passengers weighing a total of 340 pounds. A second example might be when the car is used for an extended trip with luggage in the trunk and two additional passengers in the rear seat. The rear seat passengers and luggage will add an additional 340 pounds to the load.

EXAMPLE 1

Total vehicle and occupant weight with two occupants and weight borne by each axle can now be easily calculated. The vehicle with occupants will weigh 4000 +340 or 4340 lb. The front axle carries 0.62×4000 or 2480 lb (vehicle)+ 0.51×340 or 173 lb (front seat occupants), in total 2653 lb. Each front tire will bear half this load or about 1327 lb. The rear axle carries 0.38×4000 or 1520 lb (vehicle weight)+ 0.49×340 or 167 lb (front seat occupants) or 1687 lb. Thus each rear tire will support about 844 lb.

Actual tread width of the tires being used was measured as 6 ⅜ (6.38) inches. The grown diameter of 27.01 inches from the Tire and Rim Manufacturers Association data sheets is multiplied by the empirically determined tread length determining factor of 0.200 for the front tires and 0.205 for the rear tires to obtain the optimum tread lengths. For the front tires this is 27.01×0.200 or 5.40 inches. The equivalent tread length for the rear tires is 27.01×0.205 or 5.54 inches. Multiplying these tread lengths by the tread width gives a desired footprint area for the front tires of 5.40×6.38 or 34.45 in$^2$. The similar footprint area for the rear tires should be 5.54×6.38 or 35.35 in$^2$. Finally, dividing the loads by the footprint area will determine the optimum tire pressure. For the front tires this would be 1327/34.45 or 38.5 psi. Optimum pressure for the rear tires would be 844/35.35 or 23.9 psi.

EXAMPLE 2

Optimum tire pressure for four occupants can be similarly and easily calculated. The vehicle with occupants will weigh 4000+680 or 4680 lb. The front axle carries 2480 lb (vehicle)+0.51×340 or 173 lb (front seat occupants)+0.18× 340 or 61 lb, a total of 2714 lb. Each front tire will bear half this load or about 1357 lb. The rear axle carries 1520 lb (vehicle weight)+0.49×340 or 167 lb (front seat occupants)+ 0.82×340 or 279 lb or 1966 lb. Each rear tire will bear about 983 lb.

Optimum footprints for the tires were determined as above. For the front tires this was 34.45 in$^2$ and for the rear tires 35.35 in$^2$. Dividing the loads by the footprint area will determine the optimum tire pressure. For the front tires this would be 1357/34.45 or 39.4 psi. Determined in a similar manner, pressure for the rear tires would be 983/35.35 or 27.8 psi. It can be readily seen that the differences in optimum tire pressures are very significant if the vehicle is carrying either two and four occupants.

Similar calculations can be made for any make and model of vehicle as long as vehicle and tire parameters and occupant weight distribution are known. Similarly the calculations can be readily made for other tire configurations; e.g., when front and rear tires are different sizes or where dual rear tires are used.

Having thus described in detail the method for optimizing tire pressure in order to obtain maximum tread wear, it will be obvious to those skilled in the art that many variations can be made that have not been illustrated herein. It is the intention of the inventor that these variations should be included within the scope of the invention if encompassed within the following claims.

I claim:

1. A method of determining optimum pressure for obtaining maximum tire tread wear and performance which comprises:

determining total weight distributed to each front and rear axle with occupants and cargo and converting to load on each individual tire;

determining optimum tread length in contact with the road surface for front and rear tires by dividing grown tire diameter by a tread length determining factor;

measuring the effective tread width;

multiplying optimum tread length by effective tread width to give a desired footprint area, and dividing tire load by footprint area to determine optimum inflation pressure.

2. The method of claim 1 in which the tread length determining factor is a dimensionless number between 0.190 and 0.210.

3. The method of claim 2 in which the tread length determining factor lies between 0.200 and 0.205.

4. The method of claim 2 in which the tread length determining factor applied to front tire calculations is 96–98% of that used for the rear tires.

5. The method of claim 1 in which the vehicle has single rear tires.

6. The method of claim 1 in which the vehicle has dual rear tires.

7. The method of claim 6 in which the vehicle has a plurality of rear axles.

8. The method of claim 1 in which front and rear tires are different sizes or designations or from different manufacturers.

9. The method of claim 1 further including inflating the tires to the determined pressure.

* * * * *